United States Patent [19]
Girard

[11] 3,792,827
[45] Feb. 19, 1974

[54] VTOL AIRCRAFT WITH CRUCIFORM ROTOR WING

[75] Inventor: Peter F. Girard, La Mesa, Calif.

[73] Assignee: Teledyne Ryan Aeronautical, a division of Teledyne Industries, Inc., San Diego, Calif.

[22] Filed: Nov. 10, 1972

[21] Appl. No.: 305,261

[52] U.S. Cl............................................. 244/7 A
[51] Int. Cl. ........................................... B64c 27/22
[58] Field of Search .... 244/7 R, 7 A, 17.11; 416/20

[56] References Cited
UNITED STATES PATENTS

| 3,159,360 | 12/1964 | Ryan et al............................ | 244/7 A |
| 2,689,615 | 9/1954 | Fletcher................................ | 416/20 |
| 3,464,650 | 9/1969 | Girard.................................. | 244/7 R |

Primary Examiner—George E. A. Halvosa
Assistant Examiner—Charles E. Frankfort
Attorney, Agent, or Firm—Brown & Martin

[57] ABSTRACT

An aircraft having a combined rotary and fixed wing providing aerodynamic support in vertical take-off and landing and in high speed cruising flight. The wing is cruciform in configuration, with four similar arms extending radially from a center body, the outer portions of the arms being pivotal and controllable in the manner of helicopter rotor blades in the rotating mode of the wing. In fixed wing mode the wing is locked with two arms longitudinal to the aircraft and the other two extending laterally, one or both of the lateral arm portions being used for roll control in forward flight. The wing arms may have air brakes to slow rotation and stop the wing in proper alignment. A common turbojet power source provides propulsion for wing rotation and cruising flight.

5 Claims, 8 Drawing Figures

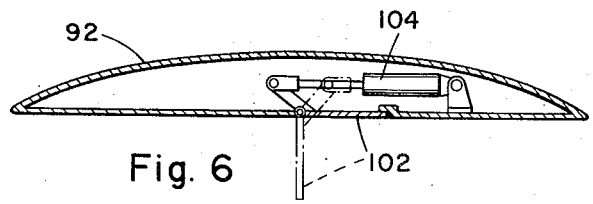
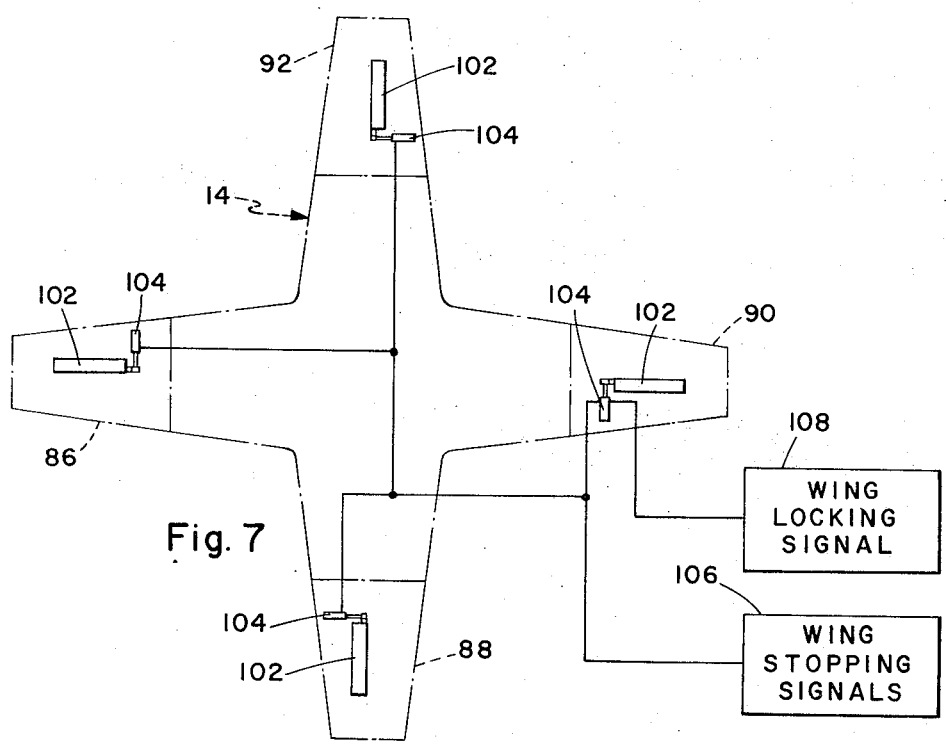
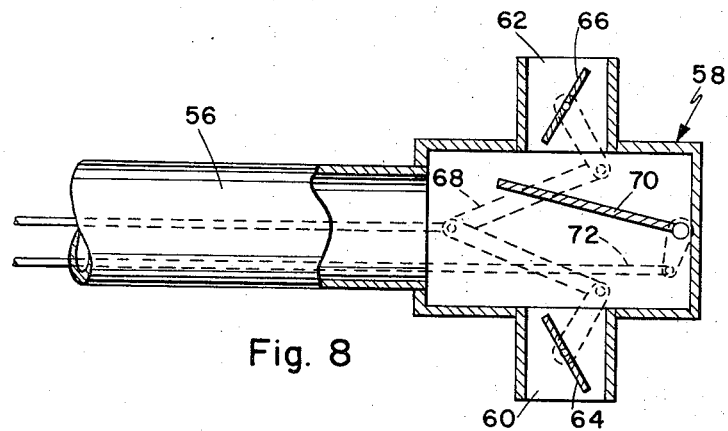

VTOL AIRCRAFT WITH CRUCIFORM ROTOR WING

BACKGROUND OF THE INVENTION

The general concept of the rotor wing, which is used in its basic form in both rotary and fixed modes without any folding or retracting elements, is described in U.S. Pats. Nos. 3,025, 3,146,970, 3,159,360 and others. In each of these the wing has a large lifting center body with three radial arms which are controlled in the manner of helicopter rotor blades in rotary wing mode, and form a modified delta wing in fixed position. In U.S. Pat. No. 3,159,360 the wing is driven in rotation by jet reaction, so avoiding the need for anti-torque control. In large aircraft the duct to the jet nozzles at the wing tips can be internal, but in small aircraft with thin wings this is not practical. The three armed wing is subject to cyclic center of pressure shifting during transistion between rotary and fixed modes, and this must be compensated for aerodynamically for proper control.

SUMMARY OF THE INVENTION

The aircraft described herein can be configured for various uses, but is particularly adaptable to use as a small remotely piloted vehicle (RPV), or drone. A simple fuselage contains the payload and has a spring leg or skid type landing gear suited to vertical take-off and landing. Turbojet propulsion means is enclosed in a short pylon on top of the fuselage and the wing is rotatably mounted on the pylon. Fixed to the underside of the wing is an elongated housing having oppositely directed nozzles at the ends inboard of the movable tip portions. A diverter valve directs exhaust gases from the turbojet tailpipe, either to the nozzles for wing rotation power, or to a rearwardly directed cruise propulsion nozzle.

The wing has a center body with four radial arms in a cruciform configuration, the tip portions of the arms being pivoted about radial axes to vary their pitch angle in the manner of helicopter rotor blades. In fixed wing position the wing is locked with two arms longitudinal to the fuselage and the other two extending laterally. The nozzle housing is streamlined along the top of the pylon in stopped position. To slow down wing rotation in transition from vertical to cruising flight and stop the wing in proper alignment, the tip portions may be provided with selectively operable air brakes. A portion of the exhaust gas is diverted to a nozzle assembly for directional control at low speed and for power modulation of the rotating wing without the need for excessive use of engine speed adjustment.

The primary object of this invention, therefore, is to provide a new and improved VTOL aircraft.

Another object of this invention is to provide a new and improved VTOL aircraft using a wing of cruciform configuration, which is driven in rotation for vertical flight and stopped for cruising flight.

A further object of this invention is to provide a new and improved VTOL aircraft having a common power source for driving the wing and for cruise propulsion.

Other objects and many attendant advantages of this invention will become more apparent upon a reading of the following detailed description and an examination of the drawing in which like reference numerals designate like parts throughout and in which:

FIG. 6 is an enlarged sectional view taken on line 6—6 of FIG. 2.

FIG. 7 is a diagram of the air brake system.

FIG. 8 is an enlarged sectional view taken on line 8—8 of FIG. 4.

DESCRIPTION OF PREFERRED EMBODIMENT

Figure 1:
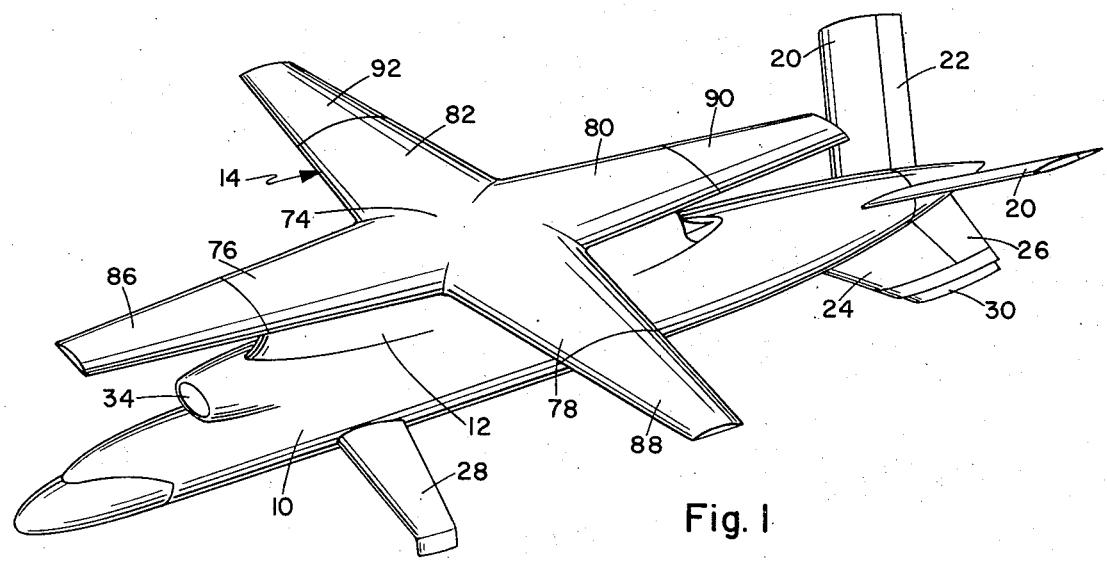
FIG. 1 is a perspective view of a typical configuration of the aircraft.
Figure 2:
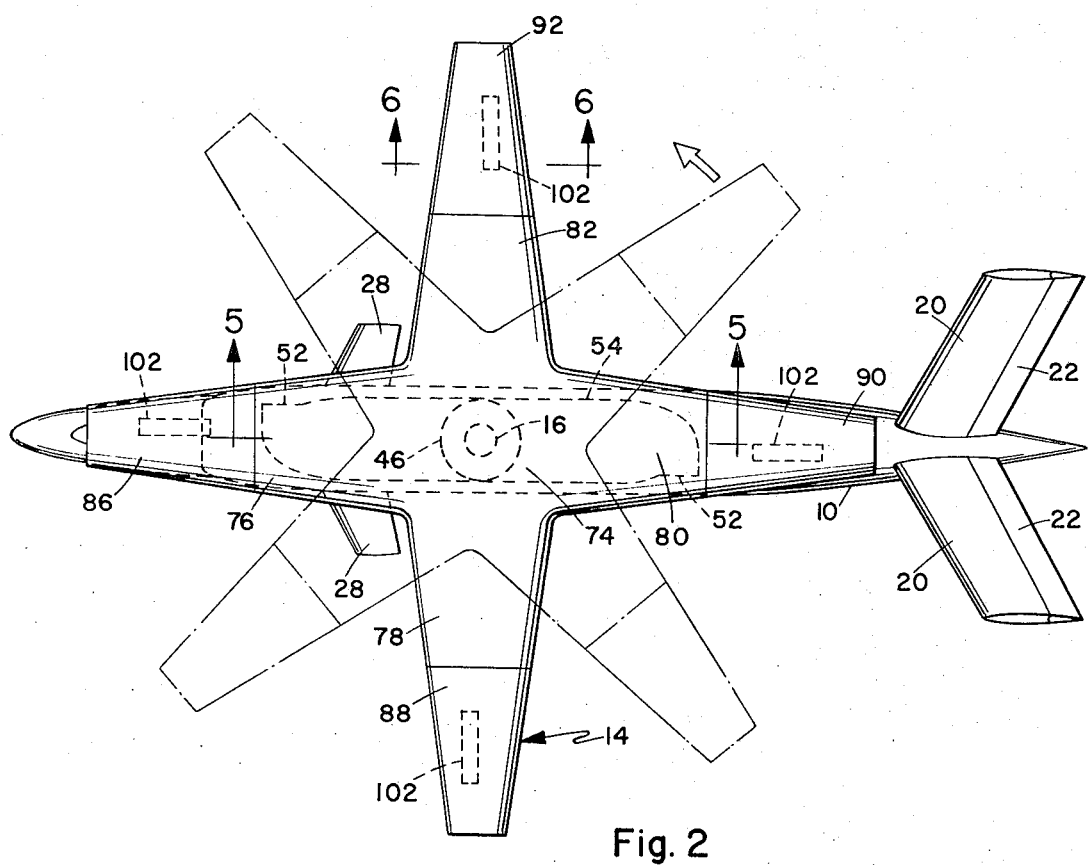
FIG. 2 is a top plan view of the aircraft illustrating fixed and rotating positions of the wing.
Figure 3:
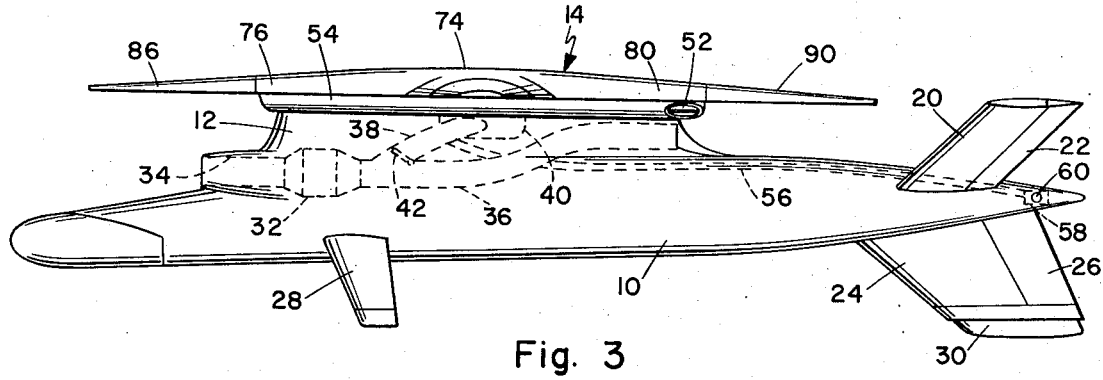
FIG. 3 is a side elevation view of the aircraft.
Figure 4:
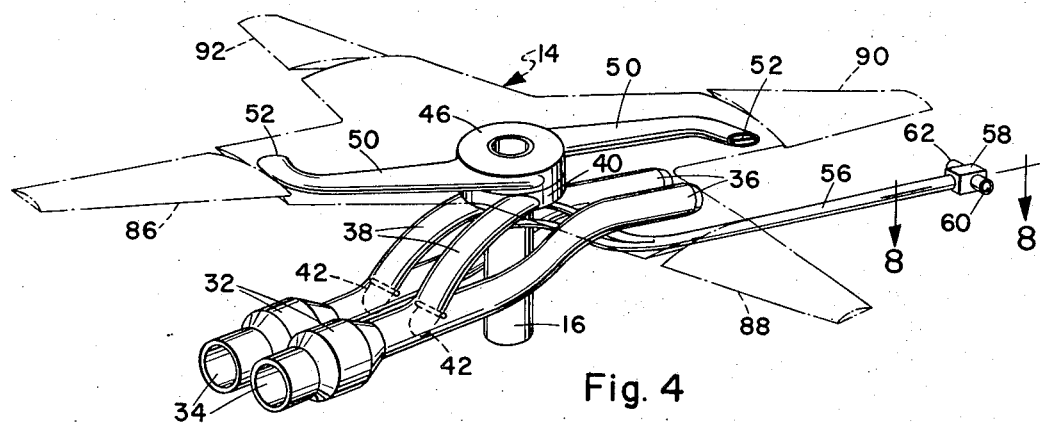
FIG. 4 is a perspective view of the propulsion system.

The aircraft is illustrated in the configuration of a small remotely piloted vehicle, or drone, but is not necessarily limited to such a use. A fuselage 10 contains the payload and controls and has a short upper pylon 12 on which the wing 14 is mounted. The wing is rotatable on a shaft 16 supported in the fuselage in bearings 18. At the rear of the fuselage are tail surfaces 20 with movable elevator 22, and a vertical sub fin with a movable rudder 26. Under the forward portion of the fuselage are suitably sprung landing gear legs 28, the aircraft resting on these legs and a shock absorbing lower tip 30 on fin 24. The tip 30 may be mounted on any suitable shock absorbing means, such as springs, fluid actuated dampers, or the like.

The propulsion system is illustrated as a pair of turbojet engines 32, each having an intake 34 in the forward end of pylon 12 and a tailpipe 36 opening rearwardly from the pylon. A single engine could be used, but the dual arrangement allows the aircraft to continue in flight in the event of one engine failing. From each tailpipe 36 a branch duct 38 extends to an individual compartment in a fixed plenum chamber 40 concentric with shaft 16. At the intersection of each tailpipe 36 and branch duct 38 is a diverter valve 42 operated by actuating means 44, to divert engine exhaust gases selectively to the tailpipe or plenum chamber 40.

On top of fixed plenum chamber 40 is rotary plenum chamber 46, with two separate compartments and a suitable rotary sealed coupling 48. From plenum chamber 46, diametrically opposed ducts 50 extend to oppositely directed nozzles 52 just inboard and clear of the movable tip portions, the ducts and nozzles being enclosed in an elongated streamlined housing 54 fixed to the underside of wing 14. The ducts and nozzles are also dual compartmented, with the corresponding compartments in each duct joining to a particular compartment in the rotary plenum chamber, to prevent mixing of the gases from the two engines and provide for efficient propulsion during one engine operation. The nozzles 52 are directed to eject exhaust gases substantially tangentially or chordwise of the wing for driving the wing in rotation.

A small bleed duct 56 extends from branch ducts 38 to a control unit 58 at the rear of fuselage 10. The control unit has a pair of directional control nozzles 60 and 62 opening to opposite sides of the fuselage. Nozzles 60 and 62 have flow control or modulating valves 64 and 66, respectively, which are opened and closed simultaneously by control linkage 68. In the control unit is a directional control valve 70, actuated by linkage 72 to control the proportion of gas flow to the two nozzles. The control unit thus provides yaw or directional control at low speeds, when the wing is in rotating mode, and also enables the exhaust gas flow to the wing to be modulated for fine adjustment of wing rotational power, without the need for varying engine speed. The valve structure is exemplary only, and any suitable means for providing collective and proportional flow may be used.

Figure 5:
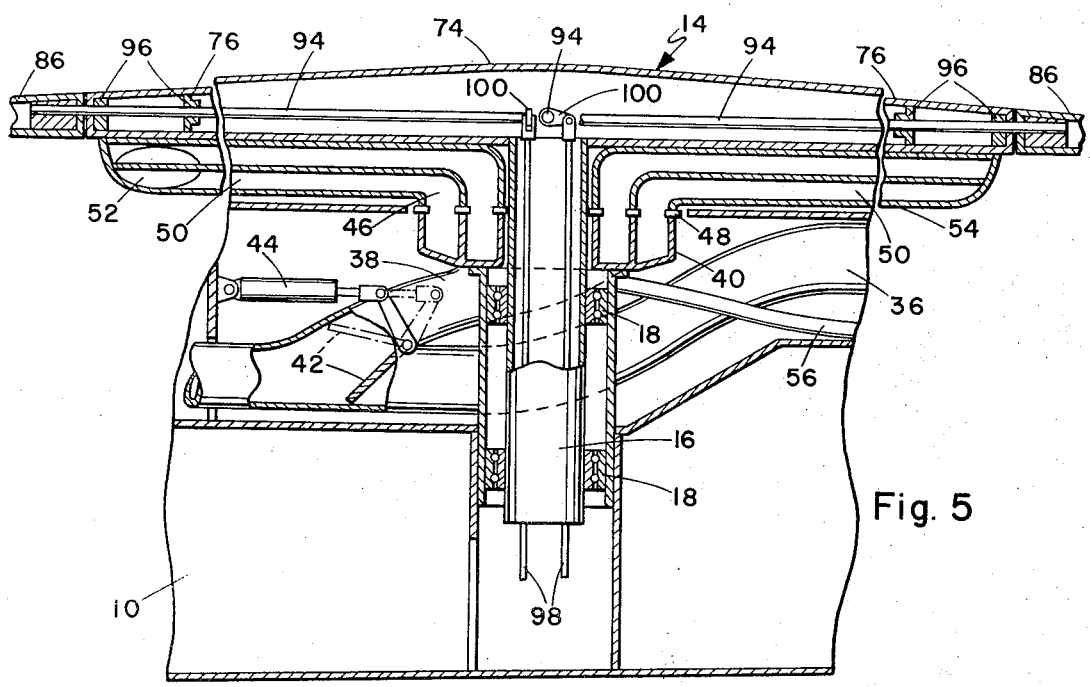
FIG. 5 is an enlarged sectional view taken on line 5—5 of FIG. 2.

Wing 14 has a center body 74 with four radially extending arms 76, 78, 80 and 82, the arms having movable tip portions 86, 88, 90 and 92, respectively. Each tip portion is pivotal in pitch angle on a substantially radial hinge shaft 94, journalled in bearings 96 in the center body structure. Pitch control of the tip portions is provided by a conventional helicopter rotor mechanism, not shown, from which connecting rods 98 are coupled to arms 100 on the inner ends of hinge shafts 94, as in FIG. 5. In stopped position of the wing, two of the arms extend longitudinally above the fuselage, and the other two extend laterally in the manner of conventional wings. For purposes of reference, arm 76 will be considered the forward arm, 80 the rear arm, 78 the left arm and 82 the right arm, when the wing is stopped as in FIG. 1.

Radial cross sections of the center body and chordal cross sections of the wing arms and tip portions are lenticular type airfoils, as typifed in FIG. 6. In the lower surface of each tip portion is an air brake 102, hinged to swing downwardly from its forward edge relative to the direction of wing rotation. The air brakes are controlled by suitable actuators 104 to extend and retract in response to signals from a wing stopping signal source 106, indicated in FIG. 7. The air brake in the rear tip portion 90 is also controlled by a wing locking signal source 108, for reasons hereinafter described.

A control system suitable for the aircraft is shown and described in detail in U.S. Pat. No. 3,159,360. This control system includes means for providing cyclic and collective pitch control of the tip portions in the manner of helicopter rotor blades, with interconnection to conventional aerodynamic surfaces in cruising flight. Also included is means for operating the jet exhaust diverter valves, jet reaction directional control in vertical and low speed flight, wing stopping and locking with use of air brakes and operation of the lateral tip portions for roll control in cruising flight. The system is thus fully compatible with the aircraft herein described and is adaptable to operation by conventional radio control means for use in a drone type aircraft.

In a typical flight, the diverter valves 42 are set to conduct exhaust gases through the plenum chamber to nozzle 52, causing the wing to rotate. The aircraft is lifted off by collective and cyclic pitch control of the tip portions, with yaw control provided by control unit 58. Cyclic pitch is then applied to attain forward flight and the aircraft is accelerated to a suitable transition speed. At the predetermined speed, diverter valves 42 are actuated to direct the exhaust gases to tailpipes 36 for propulsive thrust. The aircraft assumes a positive angle of attack and the wing autorotates at gradually reducing speed.

As the wing rotation slows down, air brakes 102 are extended by the wing stopping signal and their drag brings the wing to a stop in a short time. The air brakes on tip portions 86, 88 and 92 are then retracted, leaving the air brake on tip portion 90 extending. This extended airbrake will streamline into the relative wind, bringing the wing into proper stopped position with tip portion 90 trailing. The wing locking signal then locks the wing and retracts the remaining air brake. The aircraft is flown as a conventional jet powered type controlled by aerodynamic surfaces. One or both of the lateral tip portions can function as ailerons for roll control, the elevators 22 and rudder 26 providing pitch and yaw control, respectively.

In returning to the vertical flight mode for landing, the aircraft is slowed to a suitable transition speed. The wing is unlocked and diverter valves activated to supply jet reaction power to nozzles 52 to rotate the wing. When wing rotational speed is sufficiently high, the aircraft is landed in the manner of a helicopter.

During vertical and transitional flight, the control unit 58 makes it possible to obtain fine adjustment of rotor power without the need for varying engine speed. This is accomplished by collective operation of valves 64 and 66 to modulate the exhaust gas bleed, separately from the directional control action of valve 70.

The structure and operating technique make it practical to produce an aircraft capable of operating as a helicopter at a low disc loading, and as a high speed fixed wing aircraft, using a common wing and power source.

Having described my invention, I now claim:

1. An aircraft, comprising:
   an airframe having aerodynamic control surfaces thereon;
   a wing mounted above said airframe for rotation about a substantially vertical axis;
   said wing having a center body and four radially extending airfoil sectioned arms in cruciform configuration, each arm having a tip portion pivotally attached thereto for pitch change motion about a substantially radial axis;
   control means coupled to said tip portions for pitch change actuation thereof;
   means for locking the wing with two of said arms extending longitudinally over the airframe and the remaining two arms fixed transverse to the airframe for maintaining horizontal cruising flight;
   a power source of compressed gases in said airframe and having a rearwardly opening tailpipe extending therefrom;
   a pair of nozzles mounted below said two longitudinally extending arms inboard of the tip portions, said nozzles being oppositely directed substantially chordwise of the arms;
   a branch duct connecting said tailpipe to said nozzles;
   and a diverter valve at the junction of said tailpipe and branch duct, for directing gases selectively to said tailpipe and nozzles.

2. An aircraft according to claim 1, and including a control unit in the rear of said airframe, and a gas bleed pipe connecting said control unit to said branch duct;

said control unit having nozzles opening to opposite sides of the airframe, and valve means in the control unit for collective and proportional control of gas flow through the nozzles.

3. An aircraft according to claim 1, wherein said branch duct has a plenum chamber coaxial with the wing axis of rotation, and substantially radial ducts between the plenum chamber and said nozzles along the underside of said two arms.

4. An aircraft according to claim 1, wherein each of said tip portions has an air brake hinged in the underside to swing downwardly therefrom, and actuating means for selectively extending and retracting the air brakes.

5. An aircraft according to claim 1, wherein said aerodynamic surfaces include a fin extending downwardly below the rear portion of the airframe and having a shock absorbing lower tip;

said airframe having landing gear legs extending on opposite sides of the forward portion thereof and providing, with said shock absorbing tip, three point support for the aircraft.

* * * * *